(12) United States Patent
Spampinato

(10) Patent No.: US 7,945,103 B2
(45) Date of Patent: May 17, 2011

(54) METHOD AND APPARATUS FOR DECODING COMPRESSED AND ENCODED DIGITAL IMAGES

(75) Inventor: Giuseppe Spampinato, Catania (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 1225 days.

(21) Appl. No.: 10/863,579

(22) Filed: Jun. 7, 2004

(65) Prior Publication Data

US 2004/0258151 A1   Dec. 23, 2004

(51) Int. Cl.
  *G06K 9/36* (2006.01)
(52) U.S. Cl. ............... 382/233; 375/240.27; 375/240.28
(58) Field of Classification Search ............ 375/240.27–240.28; 341/94; 348/425.2; 382/239, 233
  See application file for complete search history.

(56) References Cited

U.S. PATENT DOCUMENTS

| | | | | |
|---|---|---|---|---|
| 5,995,171 | A * | 11/1999 | Enari et al. ............... | 375/240.27 |
| 6,052,415 | A * | 4/2000 | Carr et al. ............... | 375/240.12 |
| 6,111,916 | A * | 8/2000 | Talluri et al. ............ | 375/240.23 |
| 6,304,607 | B1 * | 10/2001 | Talluri et al. ............ | 375/240.27 |
| 2004/0071217 | A1 * | 4/2004 | Lin ........................ | 375/240.25 |

FOREIGN PATENT DOCUMENTS

| | | |
|---|---|---|
| EP | 0707425 | 4/1996 |
| EP | 1484927 A2 | 12/2004 |
| EP | 1484927 A3 | 12/2004 |

OTHER PUBLICATIONS

European Search Report, European Application No. 04011733, Oct. 21, 2004.
Lam et al. (Mar. 23, 1992) "Self-Synchronizing Variable-Length Codes for Image Transmission"; Digital Signal Processing 2, Estimation, VLSI; San Francisco, CA; vol. 5, Conf. 17:477-480.
Brailean (Sep. 21, 1999) "Wireless Multimedia Utilizing MPEG-4 Error Resilient Tools"; IEEE Wireless Communications and Network Conference (WCNC); vol. 1:104-108.
Arnold et al. (May 1999) "Error Resilience in the MPEG-2 Video Coding Standard for Cell Based Networks—A Review—Image Communication"; Signal Processing, Imaging Communication, Elsevier Science Publishers, Amsterdam, NL; 14(6-8):607-633.
Girod et al. (Oct. 10, 1999) "Feedback-Based Error Control for Mobile Video Transmission"; Proceedings of the IEEE, New York; 87(10):1707-1723.

* cited by examiner

*Primary Examiner* — Aaron W Carter
*Assistant Examiner* — Sean Motsinger
(74) *Attorney, Agent, or Firm* — Lisa K. Jorgenson; Paul F. Rusyn; Graybeal Jackson LLP

(57) ABSTRACT

Presented is a method for decoding-decompressing a compressed-encoded digital data sequence relating to at least one initial digital image. The method includes receiving the digital data sequence having compressed-encoded data groups separated from one another by at least one restart marker and each one including a respective set of encoded data structures. The method calculates a representative value of the number of encoded data structures being between a first restart marker and a subsequent second restart marker signaling, respectively, the start of a first data group to be decoded and the start of a second data group. The method then extracts from the first data group the encoded data structures, and detects the presence of at least one error, if the number of the encoded data structures extracted is different from the calculated value.

27 Claims, 12 Drawing Sheets

METHOD AND APPARATUS FOR DECODING COMPRESSED AND ENCODED DIGITAL IMAGES

PRIORITY CLAIM

The present application claims the benefit of Italian Patent Application No. MI2003A001128, filed Jun. 5, 2003, which application is incorporated by reference in its entirety.

TECHNICAL FIELD

Embodiments of the present invention relate generally to the decoding-decompression of data, and more particularly it relates to a method for the decoding-decompression of digital images.

BACKGROUND ART

Numerous algorithms are currently known for compressing and encoding both individual digital images, used for example in photographic applications, and digital image sequences, used for example in video applications.

The compression-encoding algorithms make it possible to reduce the amount of memory required for storing individual images or video sequences. Such algorithms also make it possible to reduce the bandwidth resources necessary for the transfer of the images between different devices or for the transmission thereof on telecommunications networks such as, for example, the Internet.

A compression-encoding algorithm transforms a digital image, or a digital video sequence, into a compressed and encoded digital data sequence, for example in the form of a bit sequence.

The most common and efficient compression-encoding methods currently used are based on an operation of transformation of the images in a bi-dimensional spatial frequencies domain. Of these, numerous methods use the Discrete Cosine Transform (DCT). Examples thereof are the compression-encoding methods, for individual (or still) images, compliant with the international JPEG (Joint Photographic Experts Group) standard and the compression-encoding methods, for video sequences, compliant with the international MPEG (Motion Picture Experts Group) standard, such as MPEG-1, MPEG-2, and MPEG-4.

Amongst the other standards that use compression-encoding methods based on the DCT transform, we further mention, the H263 and H26L standards.

The transformation operation is followed by a subsequent processing which reduces the information content of a digital image or of a sequence of digital images, by operating directly within the spatial frequencies domain.

After this processing aimed at reducing the information content, the images are encoded according to known algorithms, through entropic encoding methods, commonly of the type including a variable length coding (VLC). Huffman coding is for example, a particular type of entropic variable length coding (VLC) that makes it possible to reduce the number of bits necessary to represent a data set without introducing any information loss.

The thus compressed and encoded images, or video sequences, are transferred in the form of a bit sequence in storing devices or they are remote transmitted, for example they are exchanged between multimedia communication terminals.

The decoding-decompression process, typically inverse to that of encoding-compression, is aimed at the reconstruction of the digital images or video sequences from the compressed and encoded data sequence. For example, the decoding-decompression process is used in applications that require the displaying on a screen of such digital images or such video sequences.

As is known, a bit sequence, during memorization or the transmission, may be corrupted, i.e. altered, by errors.

This problem is particularly noticeable when the bit sequence is transmitted on radio channels, such as those used in the telephonic and video communications fields. The presence of disturbances of various kinds on the channel may vary the value of certain bits in the sequence, i.e. it may introduce errors.

The performances of the decoding-decompression of an encoded-compressed bit sequence with methods that use an entropic variable length coding (VLC) are considerably influenced by the presence of any errors that have corrupted the bit sequence to be decoded. This is due, for example, to the fact that certain errors may be such that a code word is erroneously interpreted as another code word of a different length, without the presence of an error being detected effectively in the decoding step. This situation may determine a loss of synchronization in a decoding step.

In this way, even an error in a single bit may entail the loss of a large amount of data, thus producing a significant degradation in the quality of the video or image.

It has been observed that the state of the art decoding-decompression techniques, for example those compliant with the different standards currently existing, in the presence of errors that alter the compressed-encoded bit sequence, do not guarantee satisfactory performances in terms of the quality of the decoded-decompressed image or sequence.

SUMMARY OF THE INVENTION

An embodiment of the present invention provides a decoding-decompression method that is robust towards errors and that is able to supply better performances than prior decoding methods.

This method is achieved with a decoding-decompression algorithm. The method provides for decoding-decompressing a compressed-encoded digital data sequence relating to at least an initial compressed-encoded digital image and provides at least a respective decoded-decompressed digital image. The method includes receiving the digital data sequence having compressed-encoded data groups separated from one another by at least one restart marker and each marker having a set of encoded data structures. The method includes calculating a representative value of the number of encoded data structures being between a first restart marker and a subsequent second restart marker which signal the start of a first data group to be decoded in the sequence received and the start of a second data group. The method includes extracting from the first data group to be decoded, the encoded data structures imbedded therein. The method provides detecting the presence of at least one error, if the number of the encoded data structures extracted is different from the calculated value.

Another embodiment of the invention provides the method for transferring digital images further including a group concealment step for discarding, if the presence of at least one error is detected, and thus providing the decoded-decompressed image replacement information.

Another embodiment of the invention is a multimedia communication apparatus. The apparatus provides at least one decoded-decompressed digital image that corresponding to a respective initial image, which performs the method.

BRIEF DESCRIPTION OF THE DRAWINGS

Further characteristics and advantages of the invention will be better understood from the following detailed description of various embodiments thereof, being non-limiting examples, in relation to the appended figures, wherein.

DETAILED DESCRIPTION OF SPECIFIC EMBODIMENTS

The embodiment of the decoding-decompression methods in accordance with the invention that will be described below will refer in a particular, but in a non-limiting way, to the decoding-decompression of a digital data sequence obtained from the compression-encoding of a video sequence in accordance with the MPEG-4 standard.

As far as this is concerned, it should be pointed out that embodiments of the present invention are also applicable to the decoding-decompression of data sequences compressed-encoded by techniques different from the particular method of compression-coding (MPEG-4) to which reference is made in the present description.

Particularly, not only are the decoding-decompression methods according to embodiments of the invention applicable to video sequence images, but they are also applicable to individual (or still) images. For example, they are applicable to individual images compressed-encoded according to the JPEG standard.

The decoding-decompression methods according to embodiments of the present invention are, for example, advantageously usable in new generation multimedia communication terminals or apparatus for transmitting/receiving through a radio frequency signal, compressed-encoded individual images, or video sequences. In such terminals, the images and the video sequences are acquired/memorized/displayed and transmitted/received using devices and technologies of the known type.

A video sequence comprises a series of consecutively acquired images that are viewed at a preset speed. In accordance with the MPEG-4 standard, the images of a video sequence may be compressed and encoded using three types of compression-encoding algorithms:

I-type (intra-image) compression-encoding, wherein the current image is compressed-encoded independently from the other images of the sequence, exploiting only the spatial correlation inside the image;

P-type (predictive) compression-encoding, wherein the current image is coded with reference to an image previous thereto;

B-type (bi-directional) compression-encoding, wherein the current image is encoded with reference to a previous image and a subsequent image.

A video sequence compressed-encoded according to the MPEG-4 standard may comprise images compressed and encoded with I-type, P-type or B-type coding interleaved with one another.

As a non-limiting example, in the present description reference is made principally to the decoding-decompression of an MPEG-4 video sequence, in which the images are compressed-encoded with an I-type compression-encoding. The below teachings, however, can be adapted to the case in which the image sequence to decode-decompress also contains images encoded according to the MPEG-4 standard with B- and P-type encoding-compression.

Figure 1:
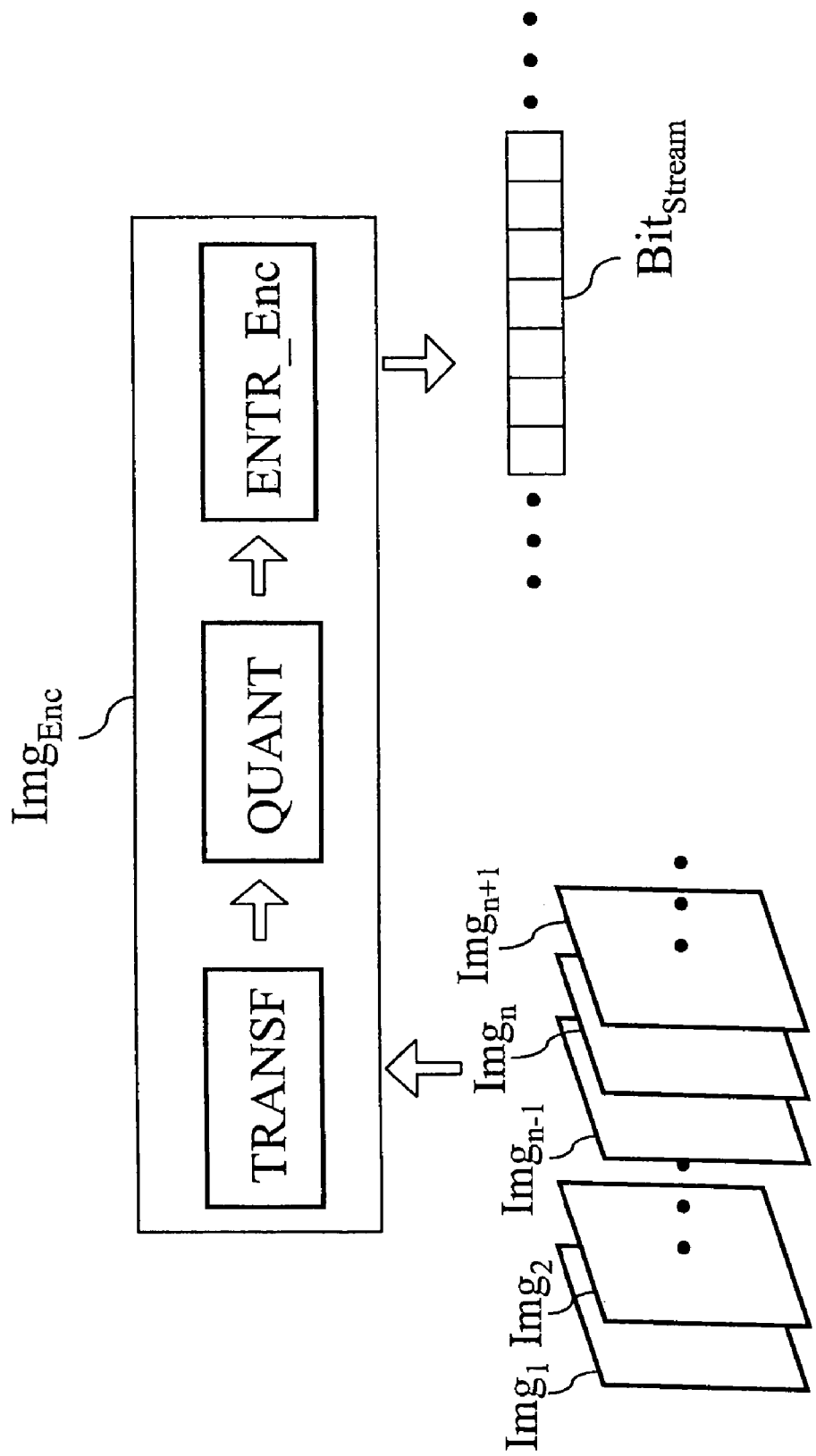
FIG. 1 shows a block diagram relating to a compression/encoding method compliant to the MPEG-4 standard.

FIG. 1 represents a block diagram of a compression-encoding method $Img_{Enc}$ compliant to the MPEG-4 standard, for compressing-encoding a digital image sequence by an I-type coding.

As in this type of coding the images are compressed-encoded irrespective of one another, we will consider the case in which the compression-encoding method $Img_{Enc}$ produces, starting from a digital image $Img_n$ pertaining to a video sequence $Img_1, Img_2, \ldots, Img_{n-1}, Img_n, Img_{n+1}$ a digital sequence $Bit_{Stream}$ compressed and encoded in accordance with the MPEG-4 standard.

For a more accurate and detailed description relating to the MPEG-4 standard reference is in any case made to the specification "ISO/IEC JTC1/SC29/WG11 N 2502: Final Draft of International MPEG-4 standard, which is incorporated by reference.

As shown in FIG. 1, the compression-encoding method $Img_{Enc}$ comprises a first processing step TRANSF in order to produce, starting from the digital image $Img_n$, a transform thereof in a bi-dimensional spatial frequencies domain. In the specific case of the MPEG-4 standard (but also in other standards such as H263, H26L, MPEG-1, MPEG-2, JPEG), the transform used is the discrete cosine transform or DCT.

For example, the digital images at input to the processing step TRANSF are in YcrCb format. As is known, the transformation operation is independently performed on the three components Y, Cr and Cb.

Furthermore, usually, the chrominance components Cr, Cb are sub-sampled before being subject to the transformation step.

Figure 2A:
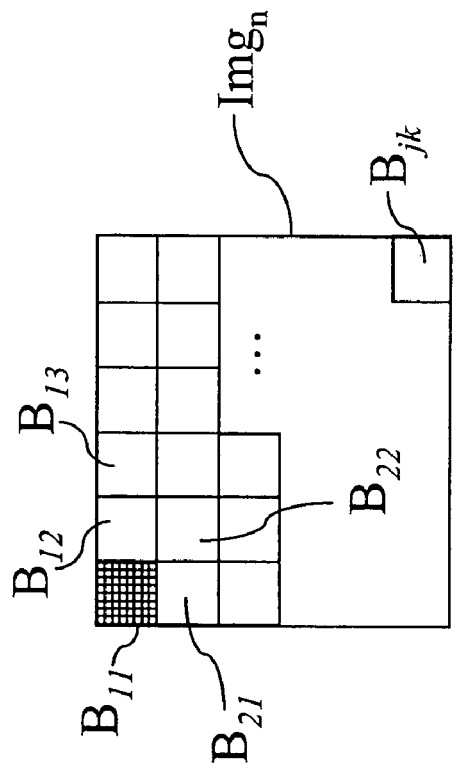
FIG. 2*a* shows a possible segmentation of a digital image into pixel blocks.

In order to obtain the transform of the image $Img_n$, in the processing step TRANSF the image $Img_n$ is segmented, as shown in FIG. 2, in a plurality of pixel blocks $B_{11}, B_{12}, \ldots, B_{jk}$, associated with adjacent and not overlapping regions of the image $Img_n$.

Commonly, such blocks are square 8×8 pixel blocks.

Figure 2B:
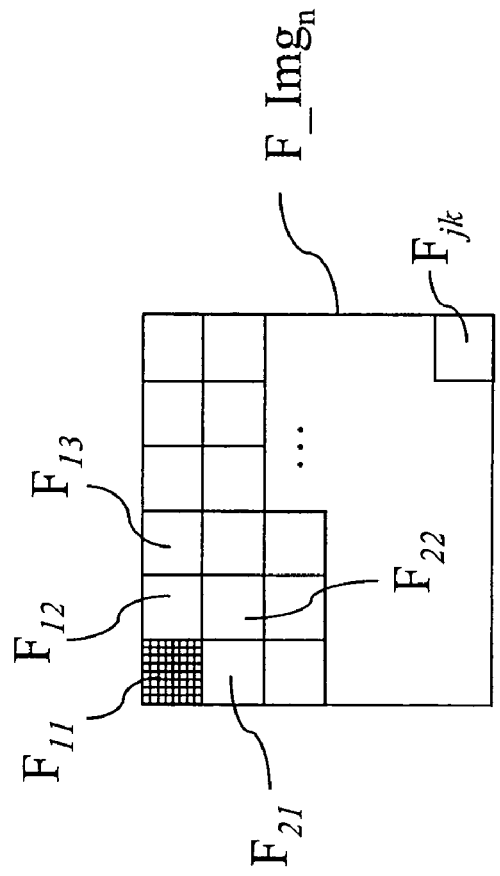
FIG. 2*b* shows a transform of the image of FIG. 2 in a spatial frequency domain.

The transform in the bi-dimensional spatial frequency domain is performed on these blocks, in this specific example the DCT, in order to obtain a corresponding plurality of blocks $F_{11}, F_{12}, \ldots, F_{jk}$ of transform coefficients, shown schematically in FIG. 2*b*.

In the specific case, the coefficients of a block are DCT coefficients and correspond to amplitudes of orthogonal waveforms that define the representation of the block in the bi-dimensional spatial frequencies domain DCT.

Hereinafter reference will be made to the transform coefficients indicating them more simply with the term "coefficients".

The plurality of coefficient blocks $F_{11}, F_{12}, \ldots, F_{jk}$, as a whole, constitutes a transform image $F\_Img_n$.

The coefficients are digital values that, on the basis of a preset number of bits used for their digital representation, belong to a range [a,b] of possible digital values, in which "a" and "b" represent the extreme digital values of the range [a,b]. For example, in accordance with the MPEG-4 standard the transformed coefficients are digital values, both positive and negative, represented on 12 bits, therefore pertaining to the range [−2048, 2047].

Figure 3A:
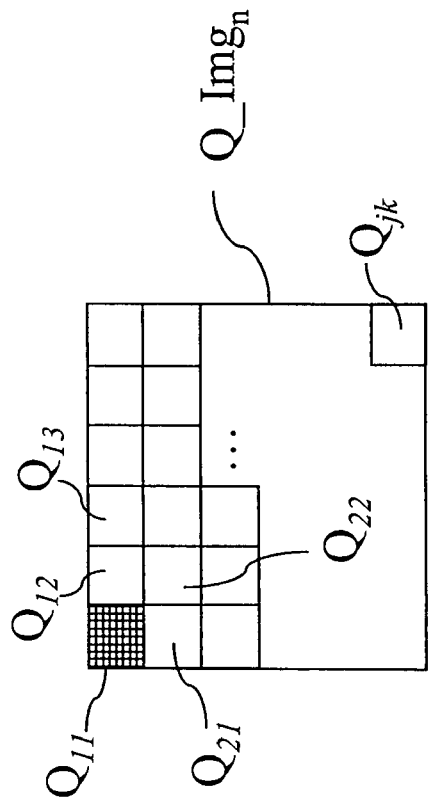
FIG. 3*a* shows the transform of FIG. 2 after a quantization step.

Returning to the scheme in FIG. 1, the compression-coding method $Img_{Enc}$ comprises a subsequent quantization step QUANT for obtaining from the plurality of blocks $F_{11}, F_{12}, \ldots, F_{jk}$ of coefficients a corresponding plurality of quantized coefficient blocks $Q_{11}, Q_{12}, \ldots, Q_{jk}$ (shown in FIG. 3*a*).

The quantization step QUANT is such to perform the division, block by block, of every coefficient of the block by a corresponding integer coefficient, denominated quantization coefficient, contained in a suitable matrix, known with the name of quantization matrix.

The quantization matrix may differ according to the component, that is the plane, of the image to be compressed. Besides, for blocks pertaining to a same plane, the quantization matrix is obtained by a multiplication step of a same initial quantization matrix for a suitable scalar coefficient, denominated quantization factor, which may differ from one block to another.

Each coefficient, after the division operation, is then subject to an operation of rounding up to the subsequent integer.

In practice, the quantization operation is such to reduce the precision used in the digital representation of the transform coefficients. By varying the quantization factor such precision is reduced to a greater or lesser extent.

Usually, due to the division operation and the subsequent rounding up operation, quantization makes equal to zero many block coefficients, above all those associated to higher spatial frequencies.

Subsequently the quantized transform coefficient blocks $Q_{11}, Q_{12}, \ldots, Q_{jk}$ are individually subject to an entropic encoding step ENTR_Enc.

Figure 3B:
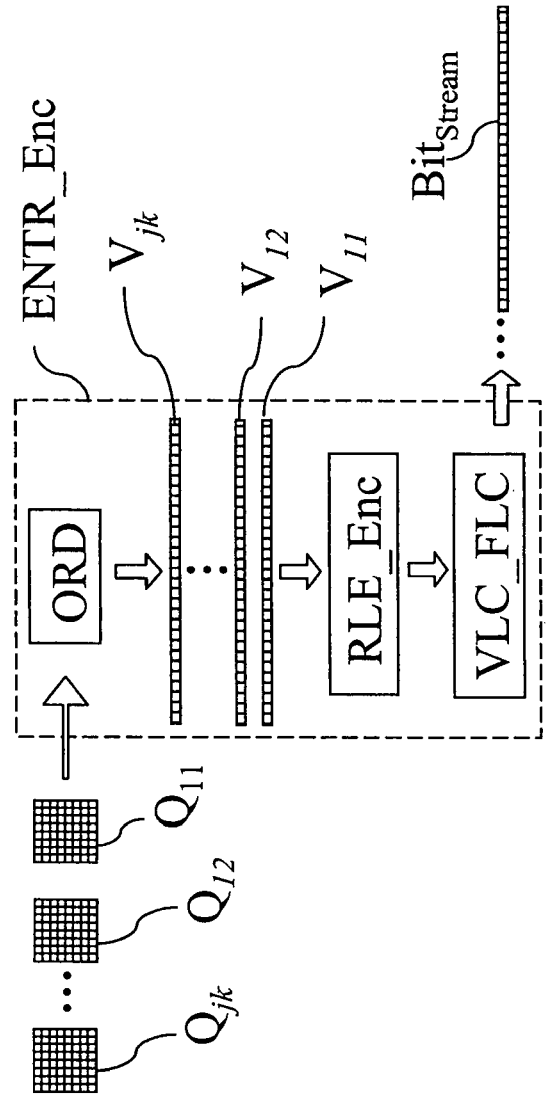
FIG. 3*b* shows in greater detail some of the steps of the block diagram of FIG. 1.

As shown in FIG. 3*b*, the entropic encoding phase ENTR_Enc includes a preliminary ordering step ORD of the quantized coefficients, which is performed block by block.

The ordering step ORD makes it possible to generate from each block, or matrix, $Q_{11}, Q_{12}, \ldots, Q_{jk}$ of quantized coefficients a respective vector $V_{11}, V_{12}, \ldots, V_{jk}$ of quantized coefficients, in which the coefficients are substantially ordered according to progressively increasing spatial frequencies.

In this way, starting from a plurality of bi-dimensional blocks or matrices of quantized coefficients, a plurality of vectors $V_{11}, V_{12}, \ldots, V_{jk}$ is produced in sequence, each one containing the quantized coefficients pertaining to a respective block $Q_{11}, Q_{12}, \ldots, Q_{jk}$.

Two examples of ordering used in the MPEG-4 standard are the ordering according to a "zig-zag" scan of the block coefficients (as in the JPEG case) and the ordering according to a scan format known as "alternating zig-zag". The latter has two variants, indicated with "alternating horizontal zig-zag" and "alternating vertical zig-zag".

The ordering step has the object of ordering the quantized coefficients of a block so as to obtain a final sequence of coefficients equal to zero, in order to increase the efficiency of the subsequent encoding step.

In fact, the coefficient ordering step ORD is followed by an intermediate encoding step RLE_Enc of the type known with the name of RLE (Run Length Encoding) or "run length", in which the quantized coefficient vectors $V_{11}, V_{12}, \ldots, V_{jk}$ are processed individually.

In this type of coding, instead of using a value for storing each quantized coefficient of a vector $V_{11}$, only the values (called "levels") of the quantized coefficients different from zero and the number (called "run") of previous coefficients equal to zero are stored. Each pair comprising a "level" value and a "run" number constitutes an output symbol produced by the run-length coding.

In a final coding step VLC_FLC the symbols on output from the intermediate processing step RLE-Enc of "run-length" coding are processed.

The final encoding step VLC_FLC includes a variable length coding operation or VLC. This operation is a reversible processing step for the encoding of data and is such to assign shorter code words to statistically more frequently occurring symbols and longer code words to statistically less frequently occurring symbols.

In accordance with encoding methods compliant to the JPEG standard, all the "run-length" symbols are encoded by a variable length coding, using standard type encoding tables.

In the final encoding step VLC_FLC, as occurs in the example in the MPEG-4 standard, in addition to the variable length coding operation a fixed length coding operation FLC may be performed.

In fact, according to certain compression-encoding methods, for example compliant to the MPEG-4 standard, the final coding step VLC_FLC performs a variable length coding operation for a subset of block symbols (constituted by the combination of a "run" and a "level") having a greater statistical frequency. The variable length coding operation, for example, associates variable length code words with symbols having a greater statistical frequency, by using standard coding tables.

The remaining symbols of the block, i.e. those that are less probable, are encoded with fixed length code words, by using a fixed length coding operation, or FLC (Fixed Length Coding).

For example, the MPEG-4 standard provides, for less probable symbols, a fixed length coding, known by the name of "ESCAPE coding".

Figure 3C:
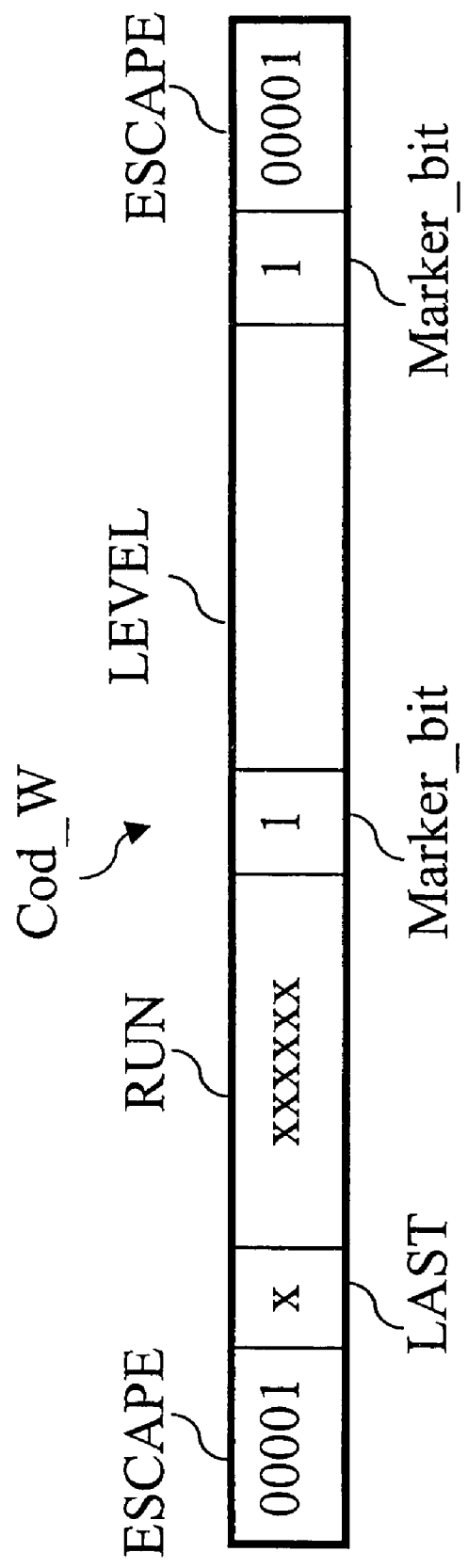
FIG. 3*c* shows an example of an "ESCAPE" type fixed length code word.

The structure of a code word Cod_W that belongs to the output alphabet of an ESCAPE fixed length coding operation is schematically illustrated in FIG. 3c, in the case in which this word is destined to be decoded with a Reversible Variable Length Decoding (RVLD).

The first and the last field indicated with ESCAPE, in this example composed by the sequence of bits 00001, serve to signal the start and end of the code word Cod_W The second field, indicated with LAST, is composed of one bit and serves to distinguish whether or not the code word is the last of the sequence.

The third field, indicated with RUN, in the example is a 6-bit sequence that contains the RUN value of an encoded signal with a "run-length" coding.

Two fields, each one composed of one bit (commonly of the value "1"), serve to avoid the emulation of the restart marker.

Finally, the LEVEL field, composed of 11 bits, contains the value ("level") of the quantized coefficient of the coded "run-length" symbol. In accordance with the MPEG-4 standard, the LEVEL field is constituted by 11 bits in the case in which reversible variable length coding (known by the abbreviation RLVD) is used, otherwise it is constituted by 12 bits.

Within the compressed-encoded sequence $Bit_{Stream}$ the encoded and compressed data resulting from the entropic coding step Entr_Enc are organized in groups, or partitions, of data. Each group comprises a respective plurality of encoded data structures.

Figure 4:
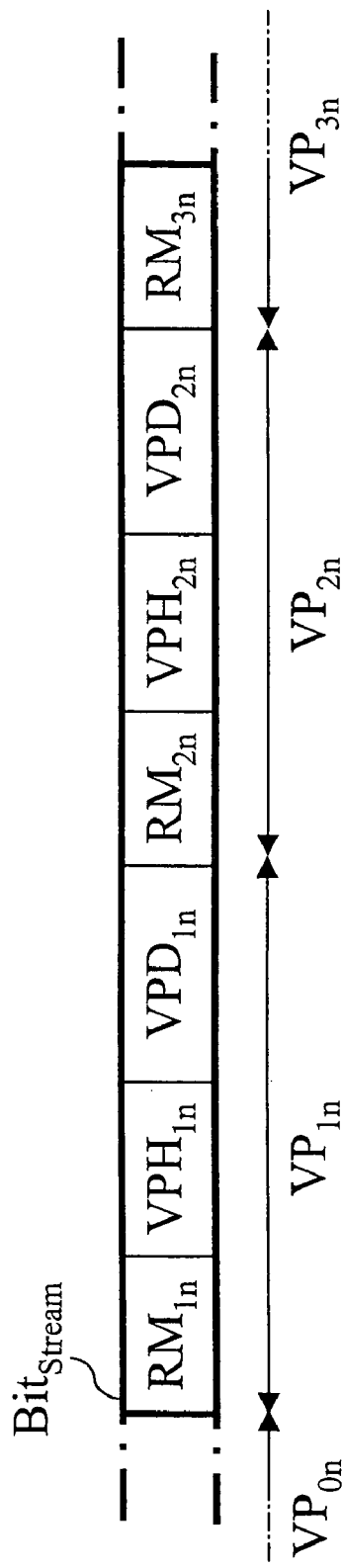
FIG. 4 shows a possible subdivision into video packets of a portion of a compressed-encoded sequence.

For example, as shown in FIG. 4, in accordance with the MPEG-4 standard, the encoded and compressed data sequence $Bit_{Stream}$, more precisely the portions thereof that comprise data relating to a same image $Img_n$, are subdivided into data groups, or segments, known with the name of video packets $VP_{0n}$, $VP_{1n}$, $VP_{2n}$, etc.

In practice, the compressed-encoded information relating to an image $Img_n$ is subdivided into a plurality of video packets $VP_{0n}$, $VP_{1n}$, $VP_{2n}$, etc.

Particularly, each video packet contains compressed and encoded information relating to a same image $Img_n$ and organized into a plurality of encoded data structures.

As shown in FIG. 4, each MPEG-4 video packet substantially comprises a restart marker $RM_{1n}$ (or resync marker), followed by a heading $VPH_{1n}$ and an encoded data field $VPD_{1n}$.

A restart marker, or indicator, $RM_{1n}$ is a particular bit sequence that makes it possible, in the decoding step, to recover synchronization. In practice, a marker indicates the end of a data group and the start of a subsequent data group.

Typically, a restart marker starts with a long series of zeroes (from 16 to 22), in a such way as to be, in a decoding step, easily identified and distinguished from bits pertaining to other fields, for example, a data field $VPD_{1n}$ or a heading $VPH_{1n}$.

Figure 5:
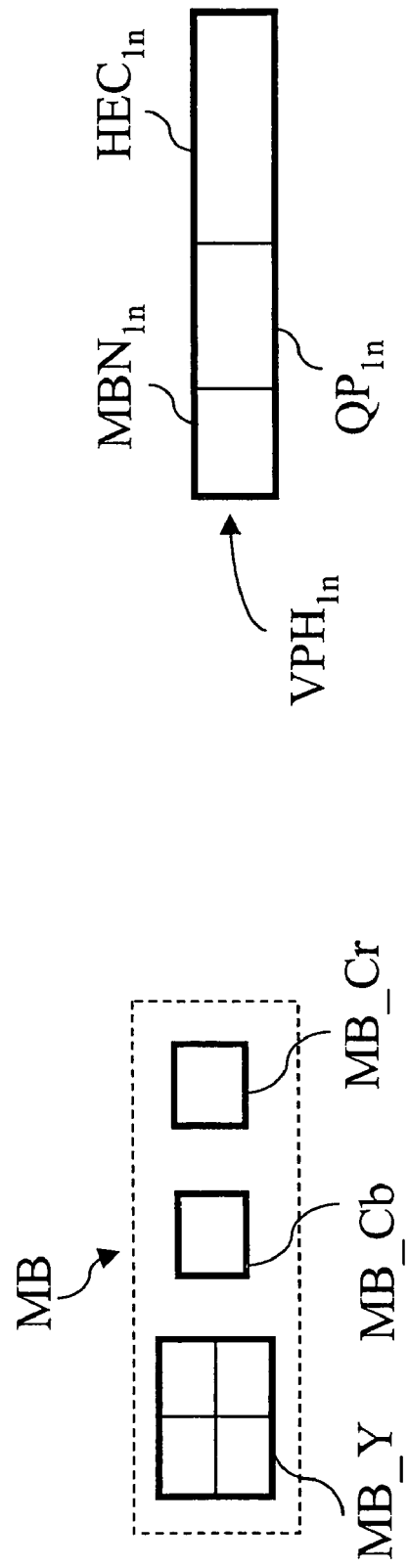
FIG. 5 shows the structure of a macroblock and the structure of a video packet.

As shown in FIG. 5, a heading $VPH_{1n}$ comprises a field $MBN_{1n}$ that contains the number of the first encoded data structure, contained in the subsequent data field $VPD_{1n}$. This number, is a progressive value representative of the position, inside the image $Img_n$, of the first encoded data structure comprised in the packet $VP_{1n}$, in a scan order of the image $Img_n$ from left to right and from top to bottom.

In the case of MPEG-4 coding the encoded data structure is, in practice, a macroblock, whose description will be given in greater detail below.

In MPEG-4 coding, the field $MBN_{1n}$ contains the number of the first macroblock contained in the field data $VPD_{1n}$ of the video packet. This number corresponds to the position of such macroblock inside the image $Img_n$, in a progressive scan order of the image macroblocks in a horizontal sense, from left to right and from top to bottom.

Besides, the heading $VPH_{1n}$ comprises a second field $QP_{1n}$ that contains the value of the quantization parameter of the coefficients DCT encoded in the subsequent data field $VPD_{1n}$.

Finally, a heading $VPH_{1n}$ comprises a last field $HEC_{1n}$ containing additional information.

A data field $VPD_{1n}$ comprises data (i.e. transformed quantized and encoded coefficients) relating to a plurality of macroblocks of a same image $Img_n$. More particularly, a data field $VPD_{1n}$ comprises, for example, data relating to a sequence of macroblocks, of an image, contiguous to one another in the horizontal scan sense. The number of macroblocks contained in a data field may differ from packet to packet.

With reference to FIG. 5, a macroblock MB is an encoded data structure comprising encoded data, i.e. substantially compressed and encoded coefficients, corresponding to a region of the initial image with dimensions of 16×16 pixels. In greater detail, a macroblock MB comprises the quantized and encoded coefficients obtained from the compression-encoding of four blocks with dimensions of 8×8 of the luminance plane Y indicated overall by MB_Y. A macroblock MB further comprises the quantized and encoded coefficients obtained from the compression-encoding of two blocks with dimensions of 8×8 indicated with MB_Cb and MB_Cr, pertaining respectively to the chrominance plane Cb and the chrominance plane Cr.

A slightly different, but similar, situation is encountered in the compression of individual images, for example in methods compliant to the JPEG standard.

In accordance with the JPEG standard, in the compressed-encoded data sequence, data groups are separated from one another in pairs by restart markers. Each group comprises data relating to a respective plurality of encoded data structures.

Particularly, in accordance with the JPEG standard the quantized and encoded coefficients are organized in encoded data structures, similar to the macroblocks described above, known to one skilled in the art by the name of MCU (Minimum Compression Units). The dimensions of such structures depend on the initial sub-sampling of the chrominance planes Cr and Cb.

In greater detail, each data group comprises information relating to one or more MCU rows.

In the JPEG case, a main heading is associated with the compressed-encoded image that defines the dimension of the restart interval, that is the dimension of the data group comprised between two consecutive restart markers. In practice, the heading comprises an integer that indicates how many MCU rows are comprised between two consecutive restart markers.

Besides, identification information, for example a number, is associated with each restart marker, which serves to identify the position of the marker inside the marker sequence relating to a compressed-encoded image.

For example, with the first restart marker included in a bit sequence obtained from the JPEG coding of a digital image is associated the number "1", to the second "2" and so on in progression.

The identification information associated with a restart marker is representative of the position within the image $Img_n$ of the first encoded data structure MCU comprised within the data group that follows the restart marker, in a progressive scan order of the MCU of the image $Img_n$ in a horizontal direction, from left to right and from top to bottom.

Returning to the diagram in FIG. 1, the compressed-encoded data sequence may be, for example, memorized in memorization devices or it may, for example, be transferred from a first to a second multimedia communication terminal. In this transfer, which takes place for example through radio frequency propagation, the compressed-encoded data sequence may be altered by errors.

With reference to the example block diagram represented in FIG. 6, an embodiment of a decoding-decompression method $Img_{Dec}$ in accordance with the present invention will be described below.

In greater detail, the particular decoding-decompression method $Img_{Dec}$ described below refers to the decoding-decompression of a data sequence $Bit_{Stream}$ compressed-encoded in accordance with the MPEG-4 standard, obtained for example, by an I-type MPEG-4 compression-encoding, from a digital image sequence. This means that, for simplicity, in the present description the part of decoding that uses the motion vectors and motion compensation, used in B-type and P-type image decoding-decompression will not be described.

In one embodiment, the decoding-decompression method may be implemented by software resident in a telecommunication device, or it may be implemented as a hardware device, or as a suitable combination of hardware and software. For example, the decoding decompression method may be used in a multimedia communication apparatus or terminal suitable to receive a compressed-encoded data sequence.

Figure 6:
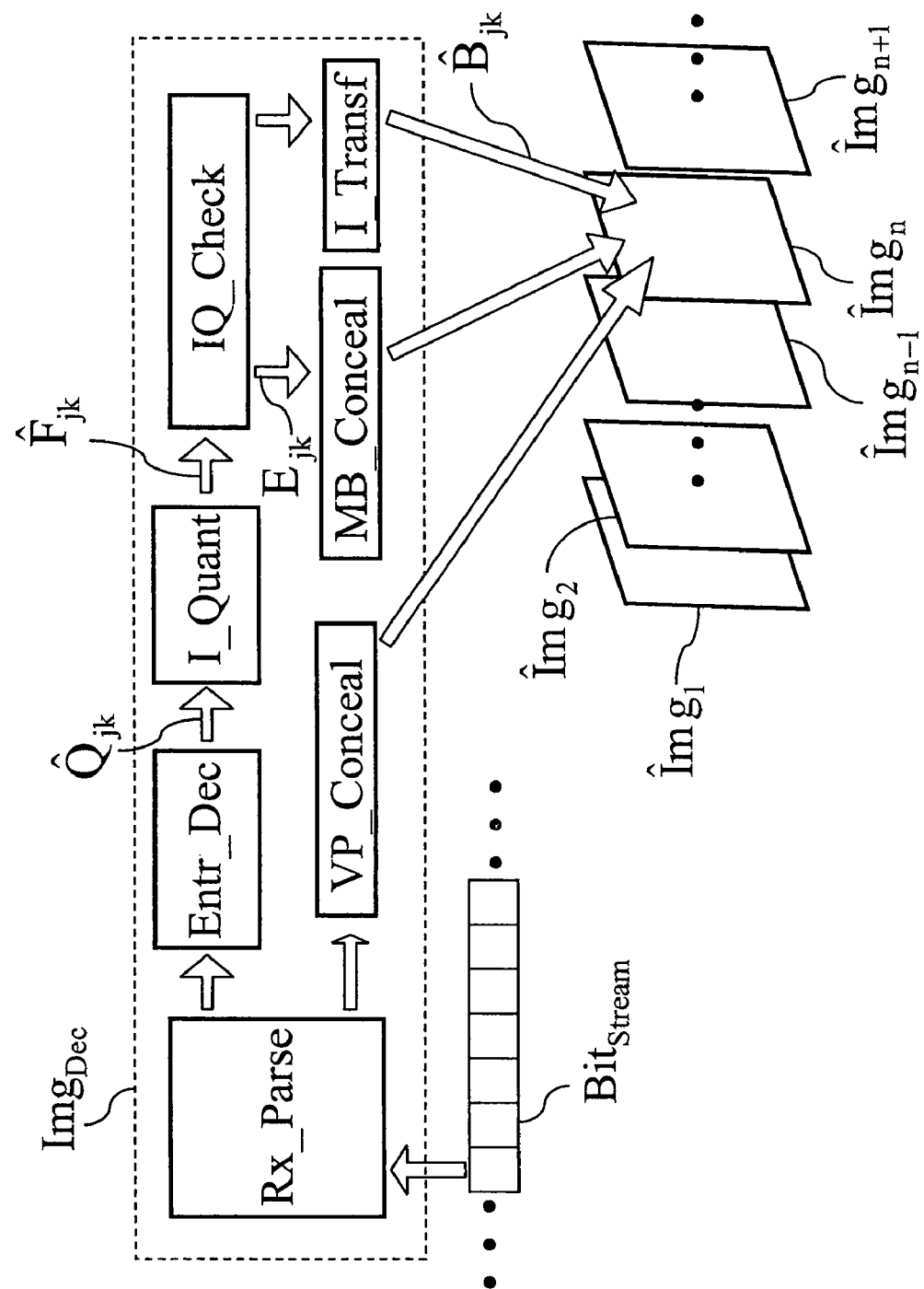
FIG. 6 shows a block diagram relating to a first embodiment of a decoding-decompression method in accordance with the present invention.
Figure 6A:
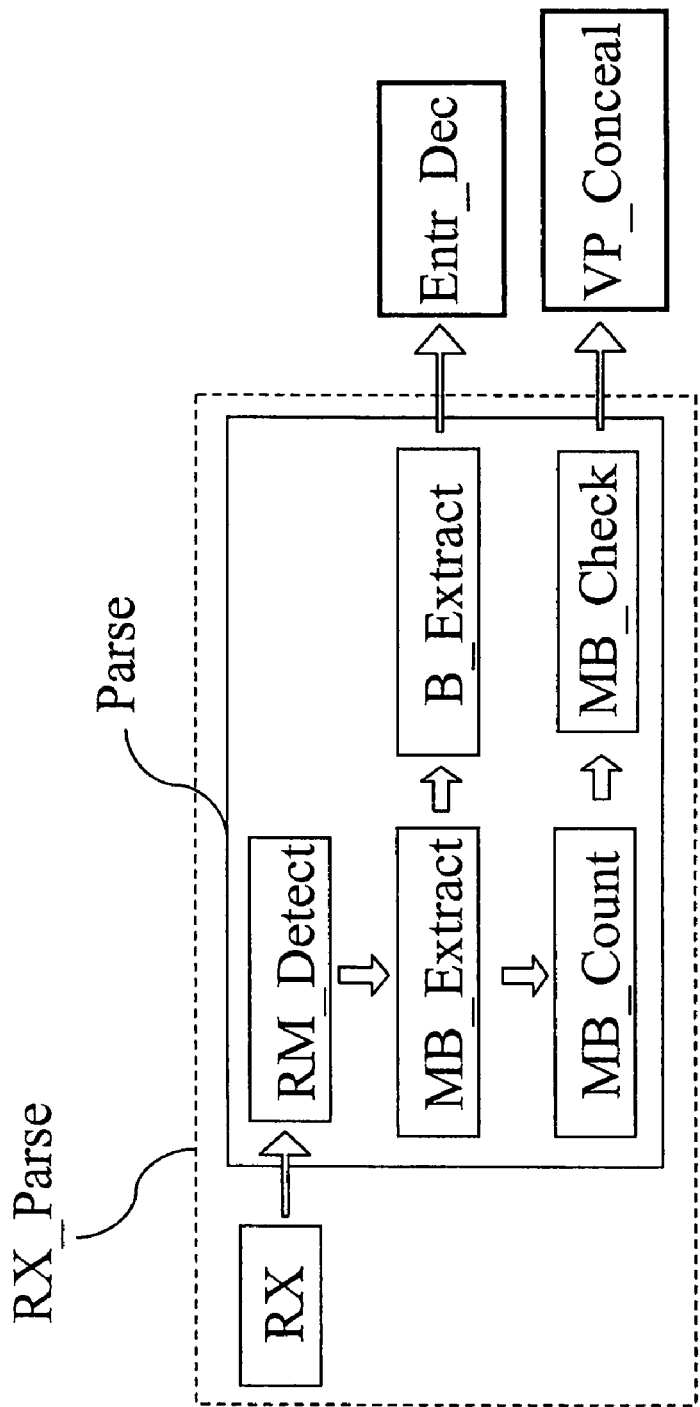
FIG. 6*a* shows in greater detail certain steps of the block diagram of FIG. 6 according to an embodiment of the invention.

The decoding-decompression method $Img_{Dec}$ comprises an initial parsing step Rx_Parse of the compressed-encoded bit sequence $Bit_{Stream}$, shown in greater detail in FIG. 6a.

The initial step Rx_Parse comprises a step RX for performing a series of operations relating to the reception/reading of the compressed encoded bit sequence. Such reception/reading operations are known, and, therefore, will not be further described.

The initial parsing step Rx_Parse also includes an analysis step Parse for performing a series of analysis operations of the sequence received aimed at identifying and extracting, therein, initially compressed-encoded data relating to different images and subsequently compressed-encoded data groups relating to different video packets of a same image.

Particularly, in the case of the MPEG-4 standard, or more in general the MPEG standard, the analysis operations are such to extract from the bit sequence received video packets $VP_{0n}, VP_{1n}, VP_{2n}, \ldots$ relating for example to an image $Img_n$ and then to extract there from the encoded data structures, that is the macroblocks MB, always relating to the image $Img_n$. Subsequently, from the latter, the analysis operations are such as to identify and separate compressed-encoded data relating to individual 8×8 pixel blocks of the image $Img_n$.

The analysis step Parse therefore makes it possible to identify the video packets within the received compressed and encoded data sequence.

As shown in FIG. 6a, the analysis step Parse comprises, preferably, a detection step RM_Detect of the restart markers, an extraction step of the macroblocks MB_Extract, an extraction step of the blocks B_Extract, a counting step of the macroblocks MB_Count and a check step MB_Check.

Particularly, the detection step RM_Detect includes the following operations:
 a first detection operation for detecting a first restart marker $RM_{1n}$ that signals the start of a respective data group, that is a video packet $VP_{1n}$, to be decoded;
 a first reading operation for reading information representative of the position within the image $Img_n$ of the first encoded data structure comprised in the video packet $VP_{1n}$ to be decoded;
 a second detection operation for detecting a second restart marker $RM_{2n}$ subsequent to the first restart marker $RM_{1n}$, that signals the start of a second video packet $VP_{2n}$, subsequent to the video packet $VP_{1n}$ to be decoded;
 a second reading operation for reading information representative of the position, within the image $Img_n$, of the first encoded data structure comprised in the second video packet $VP_{2n}$ to be decoded;
 a calculation operation for estimating, on the basis of said first and second reading operations, a representative value of the number of encoded data structures (that is, in this case of macroblocks) comprised between the first restart marker detected and the second restart marker detected. Below reference will be made to the value using the expressions "estimated value" or "calculated value" indifferently.

It should be pointed out that, for example due to errors, the first and the second restart markers detected are not necessarily consecutive markers in the compressed-encoded data flow, for example the second restart marker detected could also be the marker $RM_{3n}$ of FIG. 4.

Advantageously, in the specific case of the MPEG-4 decoding, the first reading operation is such to read from the field $MBN_{1n}$ a first value representative of the position within the image $Img_n$ of the first macroblock comprised in the video packet $VP_{1n}$ to be decoded. Also, the second reading operation is such to read from the field $MBN_{2n}$ a second value representative of the position within the image $Img_n$ of the first macroblock comprised in the subsequent video packet $VP_{2n}$.

The calculation operation, by performing a simple difference between the second and the first value obtains an estimate of the value representative of the number of macroblocks comprised between the first restart marker detected and the second restart marker detected.

The subsequent step MB_Extract, includes an operation for extracting from the video packet $VP_{1n}$ to be decoded the encoded data structures (that is to say the macroblocks) contained therein.

A subsequent step B_Extract, is such to extract from each macroblock compressed-encoded data relating to individual 8×8 pixel blocks of the image $Img_n$, that are destined to be subject to an entropic decoding step Entr_Dec.

Parallel to the extraction step of the macroblocks MB_Extract a count step MB_Count is such to keep updated a count value representative of the number of encoded data structures (that is, of macroblocks in the MPEG case) extracted in the extraction step MB_Extract and comprised in the video packet $VP_{1n}$ being decoded. Hereinafter, for simplicity, reference will be made to this value also using the expression "count value".

A subsequent check step MB_Check of the number of encoded data structures, is such to compare the thus obtained count value with the calculated value in the detection step RM_Detect.

If the count value, i.e. the number of structures extracted in the extraction step MB_Extract and comprised within the video packet $VP_{1n}$ is different from the calculated value, the check step MB_Check of the number of encoded data structures makes it possible to detect the presence of an error.

The detected error is localized in the encoded and compressed bit sequence in any point thereof between the first and the second detected restart markers.

For example, when the count value exceeds the estimated value the presence of an error is detected and in the analysis step Parse the extraction and decoding (performed in the steps MB-Extract, B_Extract, Entr_Dec and subsequent) of the macroblocks comprised between the first and the second detected restart markers is preferably interrupted.

In the case in which in the step MB_Check the presence of an error is detected a subsequent group concealment step VP_Conceal is performed.

This step comprises operations, indicated with the term "concealment operations", suitable to conceal the error and that replace with replacement information in the decoded image the portions thereof corresponding to the information comprised between the first and the second restart marker detected. This replacement is aimed at masking or concealing the errors thus avoiding, for example, the production of unpleasant artifacts in the decompressed and decoded image.

It should be pointed out that, as the first and the second restart markers detected are not necessarily consecutive, in the group concealment step VP_conceal one or more consecutive data groups, i.e. video packets, may be "concealed". The replacement of each group may be partial, i.e. only involve some of the encoded data structures present in the data group, or it may be total, involving all the encoded data structures present in the group.

In the case of a decoding of a video sequence, one possible usable replacement strategy may use, as replacement information, motion-compensated information taken from the images that in the sequence precede the image to be decoded.

According to an embodiment of the invention, in the case in which the decoding method operates an RVLD MPEG-4 decoding, in the group concealment step VP_Conceal in a video packet affected by an error, the macroblocks of the video packet to be decoded and those to be replaced are selected on the basis of a selection strategy compliant to Annex E of the MPEG standard-4 ISO/IEC JTC1/SC 29WG 11 N 2502 specifications.

Figure 6B:
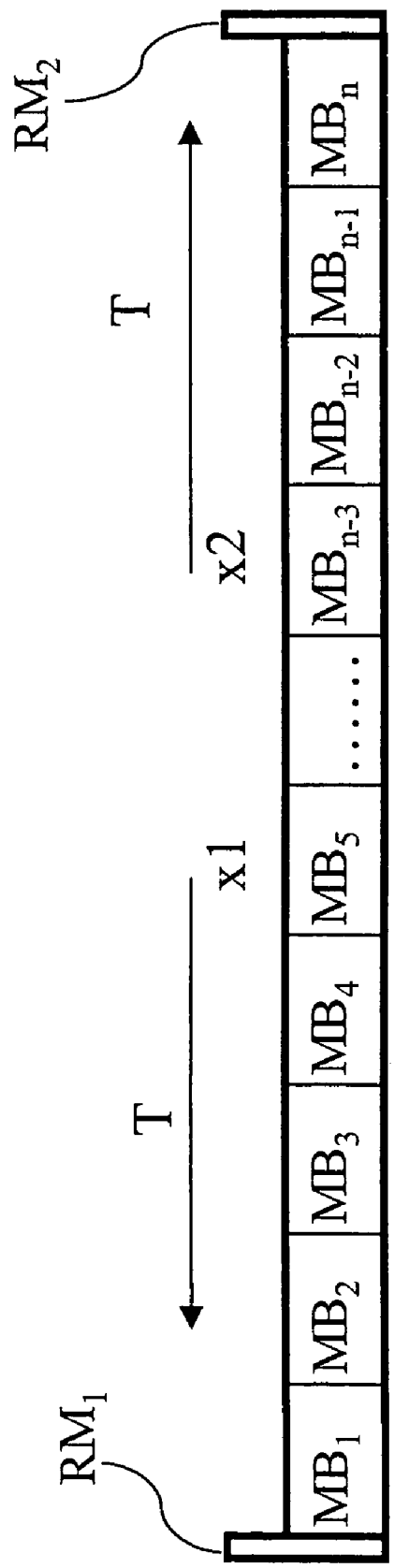
FIG. 6*b* shows an example of a selection strategy of the macroblocks to be decoded and the macroblocks to be replaced in a video packet affected by error according to an embodiment of the invention.

For example, FIG. 6b graphically illustrates a possible case of selection strategy compliant to Annex E.

The video packet VP comprises a plurality of macroblocks $MB_1, MB_2, \ldots, MB_n$ and is defined by two restart markers, an initial marker $RM_1$ and a final marker $RM_2$ respectively, for example, both detected in the detection step RM_Detect.

In accordance with Annex E, the packet VP is decoded first in a direct sense ("forward decoding") starting from the initial macroblock $MB_1$, proceeding with the decoding of the subsequent macroblocks until the detection of a first error at the bit $x_1$, for example in the macroblock $MB_5$. After the detection of an error, the decoding proceeds in an inverse sense ("backward decoding") starting from the final restart marker $RM_2$. Macroblocks $MB_n$, $MB_{n-1}$ are thus decoded, for example, until the detection of a second error at the bit $x_2$ in the macroblock $MB_{n-3}$.

In accordance with annex E, all the data comprised between bit $x_1$-T and bit $x_2$-T are discarded and replaced. T is a preset threshold, expressed as a number of bits, and represents a margin due to the fact that with a good probability an error is detected in a subsequent decoding point with respect to the real position of the error. In the example in FIG. 6b, therefore, all the macroblocks of the video packet VP, with the exception of the macroblock $MB_1$ would be discarded and replaced (for example, by using motion compensated macroblocks of the previous image). Besides, in Annex E a partial recovery of the data of macroblocks $MB_2$ and $MB_n$, i.e. of the data of those macroblocks comprising respectively the bit $x_1$-T and the bit $x_2$-T is also provided, if at least T bits have been decoded for such macroblocks.

In an embodiment of the present invention, the number of the macroblocks to be replaced is limited, in relation to the strategy recommended in the abovementioned Annex E, taking into account the presence of "not coded" macroblocks and "no-coefficient" macroblocks.

A not coded macroblock is a macroblock, encoded with P-type coding, equal to a homologue macroblock in the previous image, whereas a "no-coefficient" macroblock is a macroblock for which a particular flag, that is the flag CBP ("Coded Block Pattern"), is set to zero. In greater detail, a "no-coefficient" macroblock, is a macroblock whose coefficients AC are all equal to zero, thus it is a macroblock that does not comprise DCT coefficients encoded with variable length coding.

In a first embodiment, the limitation of the number of macroblocks to be replaced is performed by choosing to decode in any case (that is, regardless of the response of the strategy suggested by Annex E) the macroblocks of the two abovementioned types that are consecutive to one another starting from the start and from the end of the video packet.

Returning to FIG. 6b, if we had the following situation:
$MB_1, MB_2, MB_4, MB_{n-1}, MB_n$="not coded" macroblocks;
$MB_3, MB_{n-2}$="no-coefficient" macroblocks;
unlike what would happen in annex E, by applying the abovementioned limitation strategy the macroblocks $MB_2, MB_3, MB_4, MB_{n-2}, MB_{n-1}, MB_n$ would not be discarded and replaced but rather they would be decoded.

From the point of view of the end result, the decoding of the "not coded macroblocks" (instead of the "concealment" thereof) is not such as to produce differences in the decoded-decompressed image, in any case it leads to computational saving. In fact, the decoding of such macroblocks is intrinsically equivalent to a "concealment". Therefore, one avoids decoding each one of them twice (that is, once more than necessary).

On the other hand, with regards to the "no-coefficient" macroblocks, it should be taken into account, that an error in such type of structures, due to the absence of coefficients with variable length coding VLC, does not influence the decoding of other macroblocks and is not such to lead to a sensitive degradation of the decoded-decompressed image. On the contrary, a "concealment" of this type of macroblocks, in the case in which there are significant difference between the current image to be decoded and the image of the sequence decoded previously, could in some cases (also on the basis of the particular "concealment" strategy used) produce a significant degradation of the quality of the decoded-decompressed image.

Another particularly advantageous strategy in relation to Annex E, provides the performing of the total replacement of the macroblocks in which the presence of an error is detected, instead of optionally performing a partial decoding thereof. It has, in fact, been observed that the decoding of the macroblocks for which it is not possible to decode all the coefficients DCT may entail a degradation of the quality of the decoded-decompressed images.

It is further possible, to advantageously combine the two alternative strategies to annex E described above. In greater detail, an embodiment of a selection strategy of the macroblocks to be decoded and of the macroblocks to be replaced can be obtained by performing the following operations:

a) performing a forward decoding starting from the initial restart marker, by a priori selecting as macroblocks "to be decoded in any case" the macroblocks that starting from the initial marker are consecutive and of the "no-coefficient" or "not coded" type, continuing as far as the final marker if no error is detected, otherwise stopping at the first error x1 detected;

b) if an error is detected, performing a backward decoding starting from the final restart marker, a priori selecting as macroblocks to be decoded in any case the macroblocks that starting from said marker are consecutive and of the "no-coefficient" of "not coded" type, continuing as far as the initial restart marker if no error is detected, otherwise stopping at further error x2 detected;

c) if a further error x2 is detected, selecting as macroblocks to be replaced all the macroblocks comprised between the first error x1 and the further error x2, including the macroblocks in which such errors were detected; otherwise:

d) if the further error x2 is not detected, selecting as macroblocks "to be replaced" all the macroblocks comprised between the initial restart marker and the first error x1, including the macroblocks in which the first error was detected and excluding the macroblocks selected as "to be decoded" at step a).

e) applying to the remaining macroblocks (i.e. to those macroblocks that do not belong to the macroblocks selected at steps a) or b) as "to be decoded" or that do not pertain to the macroblocks selected in steps c) or d) as "to be replaced"), a selection strategy in accordance with Annex E.

Returning to the diagram in FIG. 6, the analysis step Parse, after the detection of an error proceeds with processing starting from the subsequent previously detected restart marker.

The analysis step Parse, described above relating to the decoding-decompression of video sequences, can be adapted in order to process a data stream obtained by the compression-encoding of a single digital image, for example, in accordance with the JPEG standard.

For example, in this latter case the detection corresponding to the step RM_Detect comprises, preferably, the following operations:

a preliminary reading operation, performed once only per image, for reading a dimension information representative of the dimension of the restart interval;

a first detection operation for detecting a first restart marker $RM_{1n}$ that signals the start of a first data group to be decoded comprising a plurality of encoded data structures (i.e. of MCU);

a first reading operation for reading information representative of the position within the image $Img_n$ of the first encoded data structure (that is of the first MCU) comprised within the first data group;

a second detection operation for detecting a second restart marker $RM_{2n}$ subsequent to the first restart marker $RM_{1n}$, that signals the start of a second data group to be decoded;

a second reading operation for reading a piece of information representative of the position, within the image $Img_n$, of the first encoded data structure (that is of the first MCU) comprised in the second data group to be decoded;

a calculation operation in order to estimate, on the basis of said preliminary, said first and said second reading operation, a representative value of the number of encoded data structures (that is, of MCU) comprised between the first restart marker detected and the subsequent marker detected.

Also in this case the first and the second restart markers detected are not necessarily consecutive markers.

In an embodiment, in the case of JPEG, the preliminary reading operation is such to read directly from the main heading of the image to be decoded the number NR of rows of MCU comprised between two consecutive restart markers.

Besides, the first reading operation is such to read directly from the first restart marker detected the sequential number N1 associated therewith. In the same way, the second reading operation is such to read the sequential number N2 associated with the second marker detected.

Advantageously, the calculation operation estimates the limit value VL on the basis of the following formula:

$$VL = (N2-N2) \times NR \times nMCU$$

in which, nMCU represents the number of MCU comprised in a row.

In the JPEG case, the step Parse, similar to the MPEG case, is such to detect an error if the number of encoded data structures, i.e. of MCU, extracted and comprised between the first and the second restart markers detected is different from the value VL calculated. In the case in which an error is detected, a subsequent replacement or "concealment" step, acts on the encoded data structures comprised between the first and the second restart markers detected.

Figure 7:
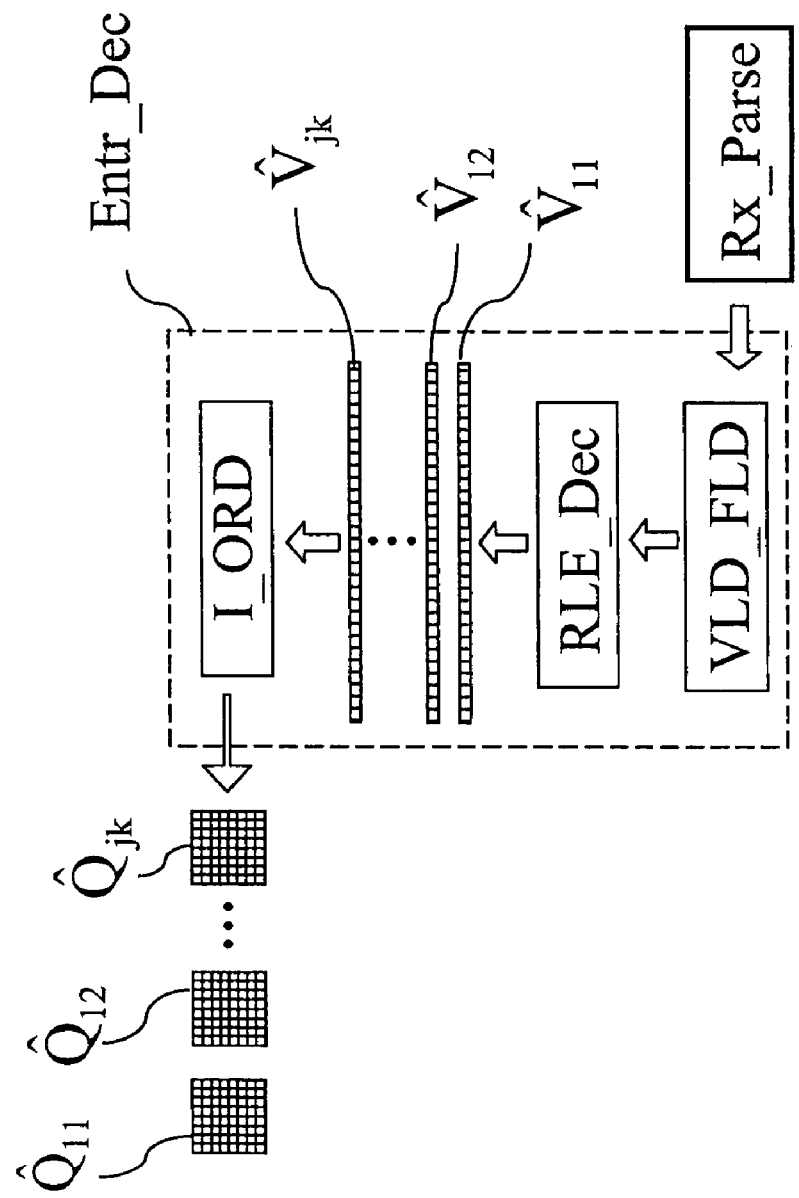
FIG. 7 schematically shows in greater detail the entropic decoding step of the block diagram of FIG. 6 according to an embodiment of the invention.

Returning to the example of the MPEG decoding method illustrated in FIG. 6, the entropic decoding step Entr_Dec is shown in greater detail in FIG. 7 according to an embodiment of the invention. This step, preferably, is such to operate on data, of the compressed and encoded bit sequence, relating to individual 8×8 pixel blocks, in order to produce at output blocks $\hat{Q}_{jk}$ of quantized transform coefficients.

Particularly, the entropic decoding step Entr_Dec includes a first processing step VLD_FLD suitable to perform a variable length decoding operation. The variable length decoding operation is performed, preferably, in a known way, through the use of a decoding table, in order to produce at output quantized transform coefficients, preferably in the form of "run length" symbols.

As occurs in the decoding in accordance with the MPEG standards, the first processing step VLD_FLD is also suitable to perform a fixed length decoding operation, in order to decode the coefficients that in the respective blocks have a lesser statistical occurrence and for this reason are compressed-encoded with fixed length coding (FLC).

The fixed length decoding operation is performed preferably, in a known way, for example, by means of an "ESCAPE" decoding, for producing at output, quantized transform coefficients, preferably in the form of "run-length" symbols.

In an embodiment in which at output from the first processing step VLD_FLD quantized transform coefficients are produced in the form of "run-length" symbols, the entropic decoding step Entr_Dec includes an intermediate RLD (Run Length Decoding) decoding step for producing vectors $\hat{V}_{jk}$ comprising quantized coefficients ordered substantially according to growing spatial frequencies.

In the embodiment represented in FIG. 7, the entropic decoding step Entr_Dec includes a final inverse ordering step I_ORD that makes it possible to reorder the quantized coefficients of each vector $\hat{V}_{jk}$ in a data structure in the form of a block $\hat{Q}_{jk}$, or matrix, of quantized coefficients. The inverse ordering operation I_ORD corresponds to an operation inverse to that of ordering ORD performed during compression-encoding.

If, during the entropic coding step ENTR_Enc, or during the transmission of the compressed-encoded data sequence $Bit_{Stream}$, or the storing thereof on a physical memory medium or, again, during the entropic decoding step Entr_Dec errors occur, the blocks of quantized coefficients $\hat{Q}_{jk}$ supplied at output from the entropic decoding step Entr_Dec do not coincide with the corresponding quantized coefficient blocks $Q_{jk}$ supplied on output from the quantization step in the compression-encoding procedure.

Returning to the diagram in FIG. 6, the blocks of quantized coefficients $\hat{Q}_{jk}$ at output from the entropic decoding step Entr_Dec are subject to a dequantization or inverse quantization, indicated in the figures with I_Quant. The latter is performed according to conventional techniques and will not be further described.

The inverse quantization step I_Quant is such to produce from blocks of quantized coefficients $\hat{Q}_{jk}$ respective blocks of dequantized coefficients $\hat{F}_{jk}$.

The blocks of dequantized coefficients $\hat{F}_{jk}$ supplied at output from the inverse quantization step I_Quant do not coincide, due to both any errors and due to the loss of information intrinsic to the non-reversible process of quantization-inverse quantization, with the corresponding blocks of transform coefficients $F_{jk}$ supplied on output from the transformation step TRANSF in the compression-encoding procedure $Img_{Enc}$.

As shown in FIG. 6, the decoding-decompression method $Img_{Dec}$ comprises preferably a further error check step IQ_Check on the dequantized coefficients.

In an embodiment, the error check step IQ_Check on the dequantized coefficients analyzes the blocks of dequantized coefficients $\hat{F}_{jk}$ supplied at output from the inverse quantization step I_Quant.

In greater detail, the error check step IQ_Check makes it possible to identify and select the dequantized coefficients of each block $\hat{F}_{jk}$ outside a preset digital value range $I_{Conc}=[L_{val}, H_{val}]$, in which $L_{val}$ represents a minimum digital value, preferably negative, and $H_{val}$ represents a maximum digital value, preferably positive.

Preferably, the preset range $I_{Conc}$ is linked to the precision used, during the compression-encoding, for the digital representation of the transform coefficients.

Figure 8A:
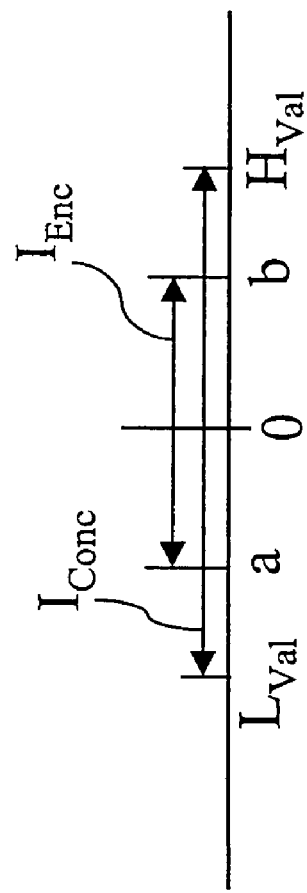
FIG. 8*a* shows a range of possible digital values for the DCT coefficients and first preset range of dequantized coefficients according to an embodiment of the invention.

Particularly, as shown in FIG. 8a, in an embodiment, the preset range $I_{Conc}$ comprises the range $I_{Enc}=[a,b]$ of the possible digital values that can be used to represent the transform coefficients in the compression-encoding step.

More preferably, the preset range $I_{Conc}$ is substantially equal, or slightly wider than the range $I_{Enc}$ of the possible digital values of compression-encoding.

For example, if in a compression-encoding step, after the DCT transformation and before the quantization, for the DCT coefficients (with sign) a 12-bit representation is used (DCT coefficients between −2048 and 2047), in the error check step a check operation will be performed in order to verify that the dequantized coefficients of each block $\hat{F}_{jk}$ pertaining to the range $[L_{val}=a=-2048, H_{val}=b=2047]$. It has been experimentally verified that this particular choice, i.e. $I_{Conc}=I_{Enc}$, is optimum in the case of "simple profile" decoding-decompression of MPEG-4 video sequences.

If for a given block $\hat{F}_{jk}$ a dequantized coefficient not within the preset range $[L_{val}, H_{val}]$ is selected, the error check step IQ_Check makes it possible to signal the presence of an error $\hat{E}_{jk}$ in the block $\hat{F}_{jk}$ at a structure concealment step, indicated in FIG. 6 with MB_Conceal, aimed at concealing the error.

If on the other hand, the presence of some error $\hat{E}_{jk}$ in the block of coefficients $\hat{F}_{jk}$, is not signaled, the error check step IQ_Check is followed by an inverse transformation step I_Transf, of a conventional type, that makes it possible transform the block of dequantized coefficients $\hat{F}_{jk}$ into a corresponding pixel block $\hat{B}_{jk}$ of the decoded and decompressed image $\hat{Img}_n$.

The structure concealment step MB_Conceal in order to conceal the error comprises operations, indicated with the term of "concealment", aimed at replacing the information identified as corrupted by errors with replacement information that in some way masks or conceals the errors, thus avoiding, for example, the production of unpleasant artifacts in the decoded and decompressed image $\hat{Img}_n$.

It should be pointed out that, as the detection of an error is performed within the spatial frequency domain, it is not possible to know the exact position of the error inside the pixel block to be decoded-decompressed.

For this reason, the coefficient block $\hat{F}_{jk}$ is preferably discarded and replaced and is not subject to an inverse transformation phase.

In the case of a video sequence, in the decoded-decompressed image $\hat{Img}_n$ in the structure concealment step MB_Conceal the pixel block corresponding to the discarded block of coefficients $\hat{F}_{jk}$ is preferably replaced with a motion-compensated block of pixels from the previously decoded-decompressed image $\hat{Img}_{n-1}$ of the video sequence.

On the other hand, in the case of the decoding-decompression of an individual image $\hat{Img}_n$, the pixel block corresponding to the discarded coefficient block $\hat{F}_{jk}$ is, preferably, replaced by replacement information obtained from pixel blocks spatially adjacent thereto. For example, the replacement information is obtained as an average, or as a spatial interpolation of adjacent pixel blocks.

Techniques of different types may in any case be used to substitute blocks discarded because affected by errors.

In one embodiment variant, in the case of a decoding-decompression method for video sequences, the structure concealment step MB_Conceal conceals, i.e. discards and replaces, the entire macroblock MB containing the coefficient block $\hat{F}_{jk}$ affected by the error. In practice the entire encoded data structure containing a dequantized coefficient block affected by this error is discarded and replaced.

This particular latter solution presents an advantage of discarding an entire macroblock that due to errors present within a block thereof, would probably be decoded in an incorrect way.

Another advantage linked to this choice is due to the fact that the post-processing algorithms of decoded-decompressed images applied subsequently to the decoding-decompression operate, conventionally, at a macroblock level.

The same principle is applicable for the decoding-decompression of individual images, for example encoded-compressed according to the JPEG standard. For example, in another embodiment variant, in the case of a decoding-decompression method for individual images, for example in accordance with the JPEG standard, in the structure replacement step MB_Conceal aimed at concealing the error, the entire minimum compression unit MCU containing the coefficient block $\hat{F}_{jk}$ affected by error is discarded and replaced.

In one embodiment, the error check step IQ_Check detects the presence of an error by analyzing and selecting exclusively coefficients of the coefficient block $\hat{F}_{jk}$ obtained from an initial entropic fixed length decoding FLD step. In fact, the decoding of such coefficients is often particularly critical in the presence of errors.

Figure 9:
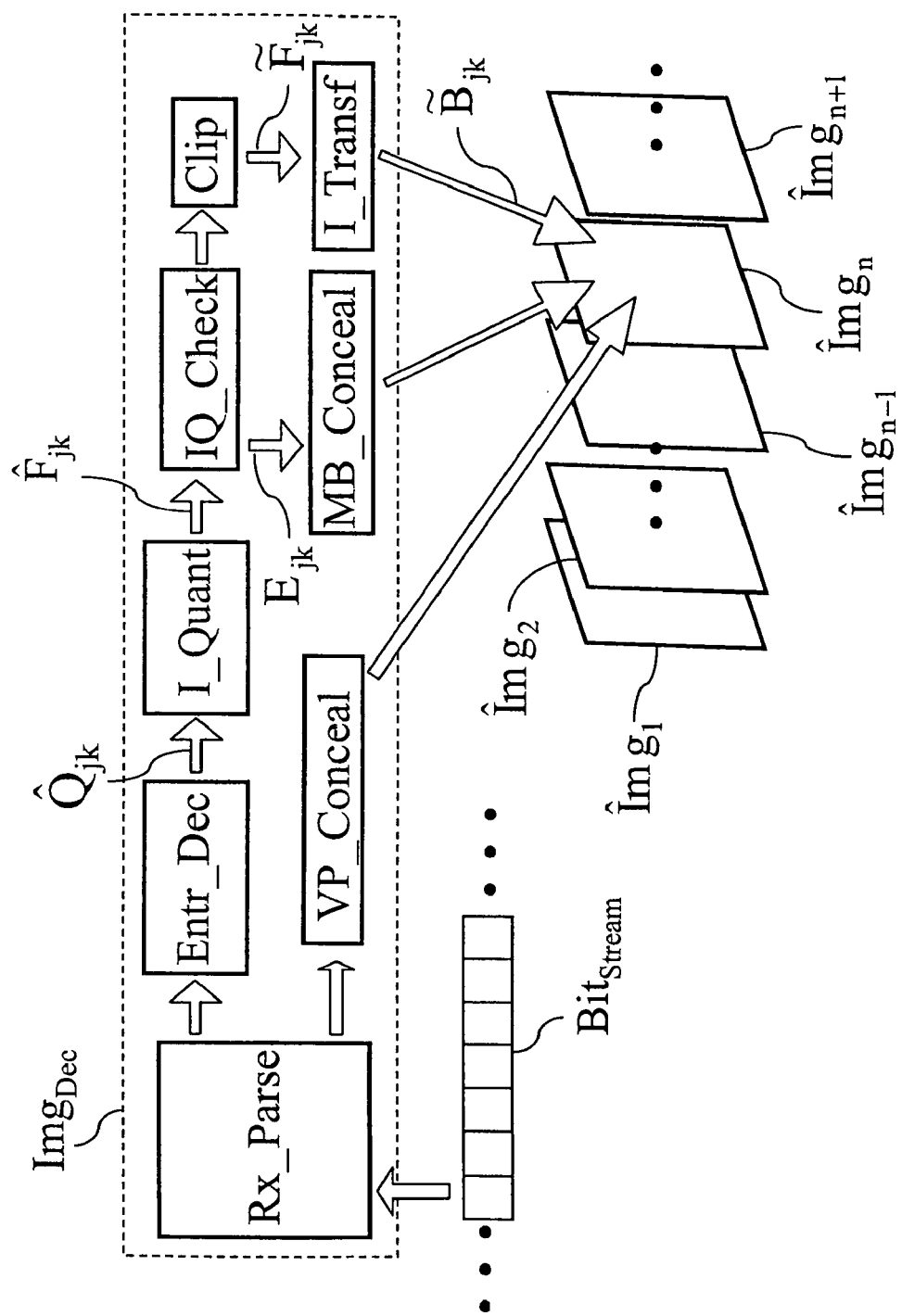
FIG. 9 shows a block diagram relating to an alternative embodiment of a decoding-decompression method in accordance with the present invention.

FIG. 9 shows an embodiment variant of the decoding-decompression method described above and represented in FIG. 6.

In the variant of FIG. 9 the error check step IQ_Check analyzes the decompressed coefficient blocks $\hat{F}_{jk}$ supplied on output from the inverse quantization step I_Quant.

Figure 8B:
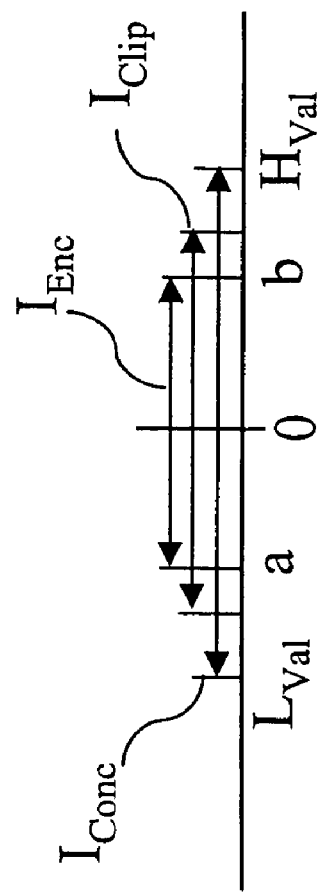
FIG. 8*b* shows a range of possible digital values for the DCT coefficients, a first preset range of dequantized DCT coefficients and a second pre-set range of dequantized DCT coefficients according to an embodiment of the invention.

In greater detail, with reference to FIG. 8b, in the error check step IQ_Check a first check operation IQ_Check, is performed, identical to that described previously, in order to select dequantized coefficients for each block $\hat{F}_{jk}$ outside a first preset range of digital values $I_{Conc}=[L_{val}, H_{val}]$, wherein $L_{val}$ represents a minimum digital value, preferably negative, and $H_{val}$ represents a maximum digital value, preferably positive.

If for a given block $\hat{F}_{jk}$ a dequantized coefficient is chosen that is not included in the first preset range $I_{Conc}=[L_{val}, H_{val}]$, the presence of an error is signaled $\hat{E}_{jk}$ in the block $\hat{F}_{jk}$ and, therefore, the structure concealment step MB_Conceal previously described with reference to the embodiment of FIG. 6 is performed.

If, on the other hand, the presence of an error $\hat{E}_{jk}$ in the coefficient block $\hat{F}_{jk}$ is not signaled, a subsequent clipping step Clip selects the coefficients of the block $\hat{F}_{jk}$ to be corrected. In greater detail, the clipping step Clip selects any coefficients within the first preset range $I_{Conc}$ and outside a second range of digital values $I_{Clip}$, comprised in said first range $I_{Conc}$.

Preferably, the clipping step Clip, performs a clipping operation, equaling each coefficient selected for the correction to the respective nearest extreme of the second range.

The corrected dequantized coefficient block $\tilde{F}_{jk}$, produced at output by the clipping step Clip is subsequently subject to the inverse transformation step I_Transf, which produces a corresponding corrected pixel block $\tilde{B}_{jk}$ of the decompressed-decoded image $\hat{Img}_n$.

Experimental results have shown that the decoding-decompression method in accordance with embodiments of the present invention provides significant increase in performance, in terms of the quality of the decoded-decompressed images, in relation to conventional-type decoding-decompression methods.

Figure 10:
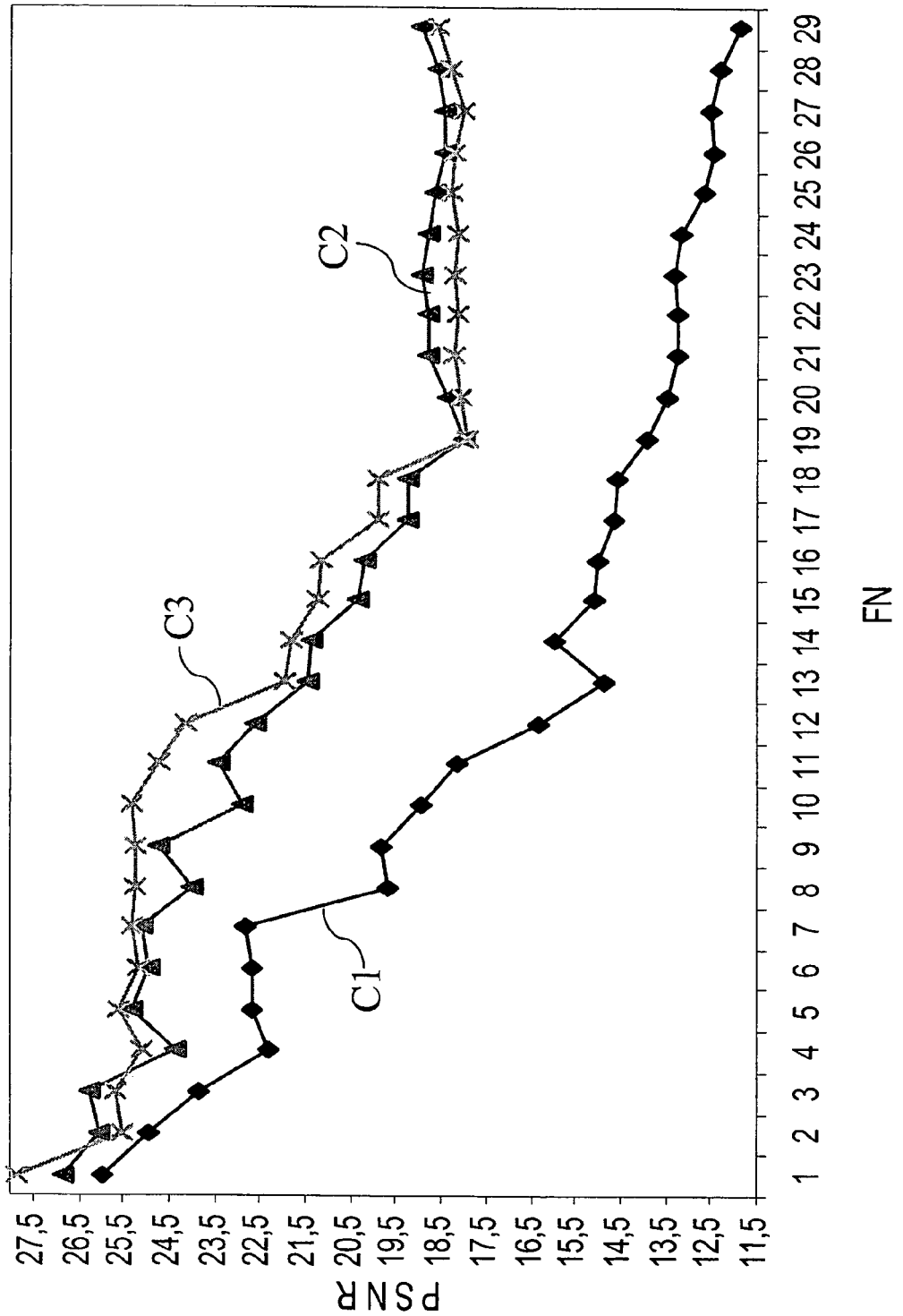
FIG. 10 shows an experimental graph relating to the performance comparison between a decoding-decompression method according to an embodiment of the present invention and a conventional method.

The graph shown in FIG. 10 refers to the decoding-decompression of a 128 Kb/s video sequence, containing errors and compressed-encoded in accordance with the MPEG-4 Simple Profile standard with reversible variable length coding RVLC.

The abscissa shows the position of each image in the sequence. That is, FN=1 corresponds to the first image of the sequence.

In the sequence, the first image is coded with I-type compression-encoding, the subsequent images with P-type compression-encoding.

Four curves are traced in the graph. The first of these, indicated with C1, bears a measurement of the quality, in terms of PSNR (Peak-to-peak Signal to noise ratio), of the decoded-decompressed images obtained with a standard decoding-decompression method MPEG-4 (in short, Annex E).

The curve indicated with C2, refers on the other hand to a decoding-decompression method in accordance with an embodiment of the present invention and, more particularly, in accordance with a first embodiment that provides the use of an error check on the number of encoded data structures in accordance with the MB_Check phase described above, and does not provide the use of an error check step IQ_Check on de-quantized coefficients.

The curve indicated with C3 refers to a decoding-decompression method in accordance with an embodiment of the present invention and, more particularly, in accordance with a second embodiment (represented in FIG. 6) that provides both the use of an error check on the number of encoded data structures, in accordance with the step MB_Check described above, and the use of an error check step IQ_Check on the dequantized coefficients.

The PSNR measurements made and given on the graph refer to luminance channel Y only.

Obviously, the PSNR values that can be obtained depend on the particular strategy used for concealing errors.

The values given in the graph, refer to the case in which a macroblock of the first image containing an error block is substituted with a macroblock having a constant grey level, whilst a macroblock of any one of the remaining images containing a block with errors is replaced with a macroblock taken from the previous image and motion-compensated.

As shown in the graph in FIG. 10, it is possible to obtain an average improvement in terms of PSNR of approximately 4.83 dB compared to a conventional decoding-decompression method.

In order to satisfy contingent and specific requirements, one skilled in the art may make numerous modifications and variants to the decoding-decompression method, all being within the spirit and scope of protection of this invention.

What is claimed is:

1. A method for decoding-decompressing a compressed-encoded digital data sequence relating to at least an initial compressed-encoded digital image and for providing at least a respective decoded-decompressed digital image, the method comprising the steps of:
   receiving said digital data sequence comprising compressed-encoded data groups separated from one another by at least one restart marker and each one including a respective plurality of encoded data structures, wherein said receiving step comprises the following steps performed in order as follows,
   detecting in said received sequence a first restart marker;
   prior to any extraction of the encoded data structures of a first data group in the sequence to be decoded, detecting a second restart marker subsequent to the first restart marker;
   calculating a representative value of the number of encoded data structures comprised between the first restart marker and the subsequent second restart marker signaling, respectively, the start of the first data group to be decoded in the sequence received and the start of a second data group;
   extracting from said first data group to be decoded the encoded data structures comprised therein; and
   detecting the presence of at least one error, if the number of the encoded data structures extracted is different from said representative value.

2. The method according to claim 1, further including a group concealment step for discarding, if the presence of at least one error is detected, at least part of the data comprised between said first and said second marker, thus providing in the decoded-decompressed image replacement information.

3. The method according to claim 2, further comprising a step of selecting the encoded data structures to be discarded comprised in said data group.

4. The method according to claim 1, further comprising the steps of:
   a first reading operation for reading a first piece of information representative of the position within the image of the first encoded data structure comprised in said first data group; and
   a second reading operation for reading a second piece of information representative of the position, within the image, of the first encoded data structure comprised in said second data group, and wherein a limit value is calculated on the basis of one said first and one said second pieces of information.

5. The method according to claim 4, wherein said first piece of information and said second piece of information comprise a first and a second numerical value respectively and wherein said calculating step comprises an arithmetical difference operation between said numerical values.

6. The method according to claim 4, wherein said first and said second piece of information are respectively read from a first heading and a second heading comprised/associated respectively in/to said first and to said second data group.

7. The method according to claim 4, wherein said first and said second piece of information are encoded in said first and said second restart marker respectively.

8. The method according to claim 1, wherein said at least one decoded-decompressed digital image is a video sequence of digital images, wherein said data groups are video packets and wherein said encoded data structures are macroblocks.

9. The method according to claim 1, wherein said digital data sequence is obtained from an MPEG or H263 or H26L compression-encoding operation of an initial digital images sequence and wherein said method provides a decoded and decompressed digital images sequence.

10. The method according to claim 1, wherein the digital data sequence is obtained by a JPEG compression-encoding operation of said initial digital image.

11. The method according to claim 10, wherein said data groups comprise at least one or more MCU rows and wherein said encoded data structures are MCU.

12. The method according to claim 1, further comprising the following operations:
processing the digital data sequence for obtaining, from a second data group for which the presence of an error is not detected, a plurality of dequantized blocks, each dequantized block comprising digital values corresponding to dequantized coefficients of a transform in a bi-dimensional spatial frequencies domain of a respective pixel block of the initial image;
selecting at least one first dequantized block comprising at least one of said digital values outside a first preset range of digital values; and
discarding said first selected block and providing in the decoded-decompressed image a respective pixel block comprising replacement information.

13. The method according to claim 12, wherein said step of processing the digital data sequence in order to obtain the plurality of dequantized blocks includes an entropic decoding step and a subsequent inverse quantization step, the entropic decoding step including one operation of variable length decoding.

14. The method according to claim 13, wherein said entropic decoding step further includes a fixed length decoding operation and wherein part of the digital values of said dequantized blocks are obtained from the variable length decoding operation and part of them are obtained from the fixed length decoding operation.

15. The method according to claim 14, wherein said selection step exclusively selects digital values obtained from the fixed length decoding operation.

16. A method for transferring at least one initial digital image from a first communication terminal to a second communication terminal, the method comprising the steps of:
a) compressing said at least one digital image in said first communication terminal by performing the following operations:
segmenting the initial digital image into a plurality of pixel blocks;
performing a discrete transform of the pixel blocks into a bi-dimensional spatial frequencies domain, for obtaining a corresponding plurality of coefficient blocks;
performing a quantization operation of the coefficient blocks, for obtaining a corresponding plurality of quantized coefficient blocks; and
performing an entropic coding step of the quantized coefficient blocks, encoding at least part of the coefficients by a fixed length coding and obtaining a digital data sequence;
b) transmitting said digital data sequence to the second communication terminal; and
c) receiving and decoding-decompressing said digital data sequence at the second communication terminal with a decoding-decompression method according to claim 2 in order to obtain at least one respective decoded-decompressed image.

17. The method according to claim 16, further comprising a step of acquiring said at least one initial digital image by means of the first communication terminal.

18. The method according to claim 16, further comprising a step of displaying said decoded-decompressed image at the second communication terminal.

19. The method according to claim 16, wherein said transmitting step transmits the digital data sequence on a radio communication channel.

20. A multimedia communication apparatus, comprising:
circuitry for decoding-decompressing a digital data sequence providing at least one decoded-decompressed digital image and corresponding to a respective initial image, wherein the circuitry is operable in decoding-decompression of said data sequence to receive said digital data sequence including compressed-encoded data groups separated from one another by at least one restart marker and each one including a respective plurality of encoded data structures, wherein said receiving step comprises the following operations performed in order as follows:
detecting in said received sequence a first restart marker;
prior to any extraction of the encoded data structures of a first data group in the sequence to be decoded, detecting in said received sequence a second restart marker subsequent to the first restart marker;
calculating a representative value of the number of encoded data structures comprised between the first restart marker and the subsequent second restart marker signaling, respectively, the start of the first data group to be decoded in the sequence received and the start of a second data group;
extracting from said first data group to be decoded the encoded data structures comprised therein; and
detecting the presence of at least one error, if the number of the encoded data structures extracted is different from said representative value.

21. A method including the operations set forth below being performed in the specific order set forth, the method comprising:
detecting first and second markers in a data stream;
determining from the first and second markers a first number of data structures located between the first and second markers, the data structures representing a portion of a compressed image;
only after both the first and second markers have been detected, extracting from the data stream the data structures;
determining a second number from the extracted data structures; and
comparing the first number to the second number to determine whether an error exists in the data stream between the first and second markers.

22. The method of claim 21, further comprising discarding data within at least one of the extracted data structures if an error exists in the data stream between the first and second markers.

23. The method of claim 21, further comprising replacing data within at least one of the extracted data structures if an error exists in the data stream between the first and second markers.

24. The method of claim 21, further comprising determining that an error exists in the data stream between the first and second markers when the first number has a predetermined relationship to the second number.

25. The method of claim 21, further comprising determining that an error exists in the data stream between the first and second markers when the first number does not equal the second number.

26. A circuit, comprising:
   decoding-decompressing circuitry operable to execute the following operations in the precise order set forth below on a data stream:
      detect first and second markers in a data stream;
      determine from the first and second markers a first number of data structures located between the first and second markers, the data structures representing a portion of a compressed image;
      extract from the data stream for the first time the data structures located between the first and second markers;
      determine a second number from the extracted data structures; and
      compare the first number to the second number to determine whether an error exists in the data stream between the first and second markers.

27. An electronic system, comprising:
   a circuit operable to execute the following operations on a data stream in the order set forth as follows:
      detect first and second markers in a data stream;
      determine from the first and second markers a first number of data structures located between the first and second markers, the data structures representing a portion of a compressed image;
      perform an initial extraction from the data stream of the data structures;
      determine a second number corresponding to the number of extracted data structures; and
      compare the first number to the second number to determine whether an error exists in the data stream between the first and second markers.

* * * * *